March 6, 1928.　　　　　F. J. STEFFLER　　　　　1,661,511
AUTOMOBILE SLEIGH
Filed Feb. 26, 1927　　　2 Sheets-Sheet 1
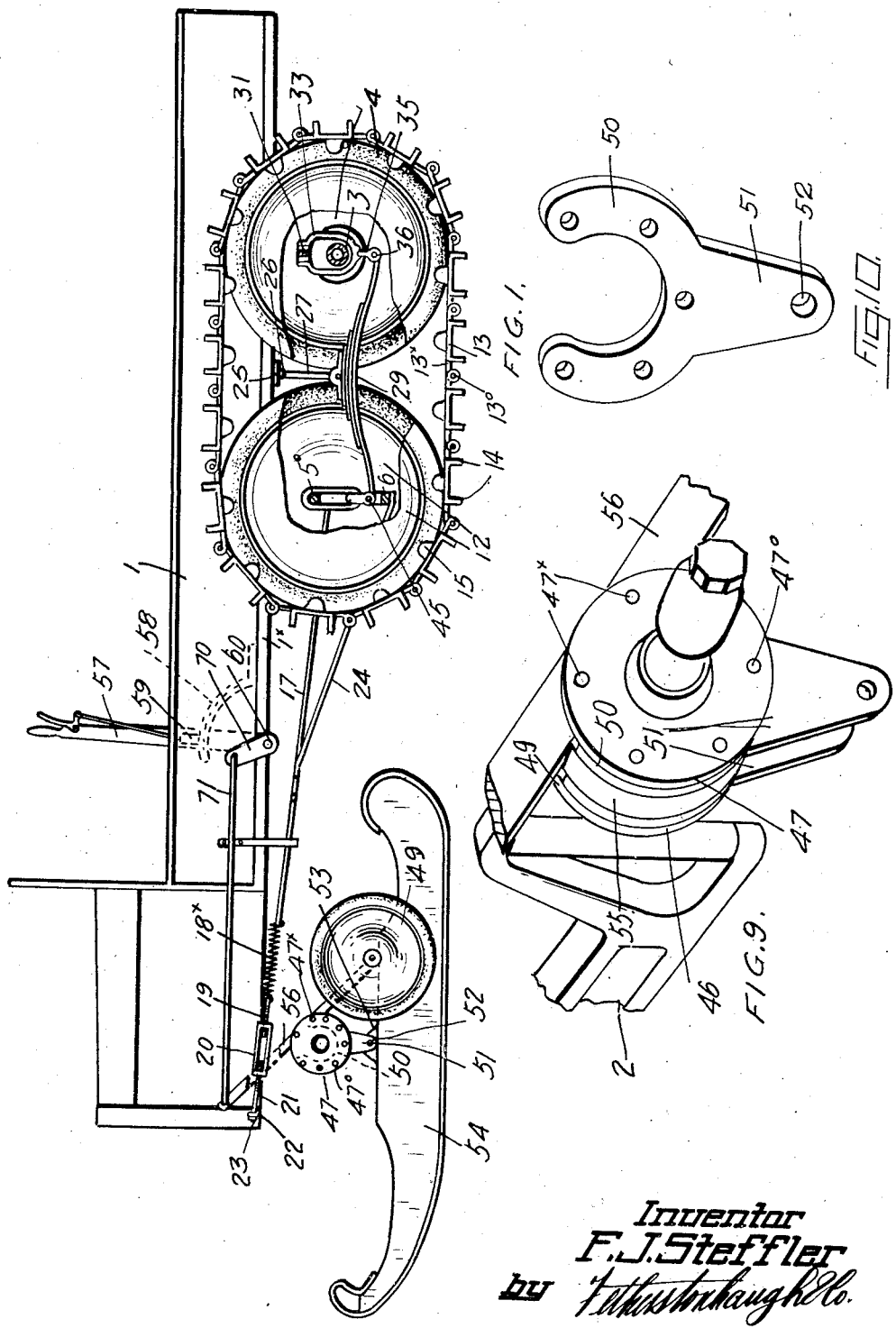

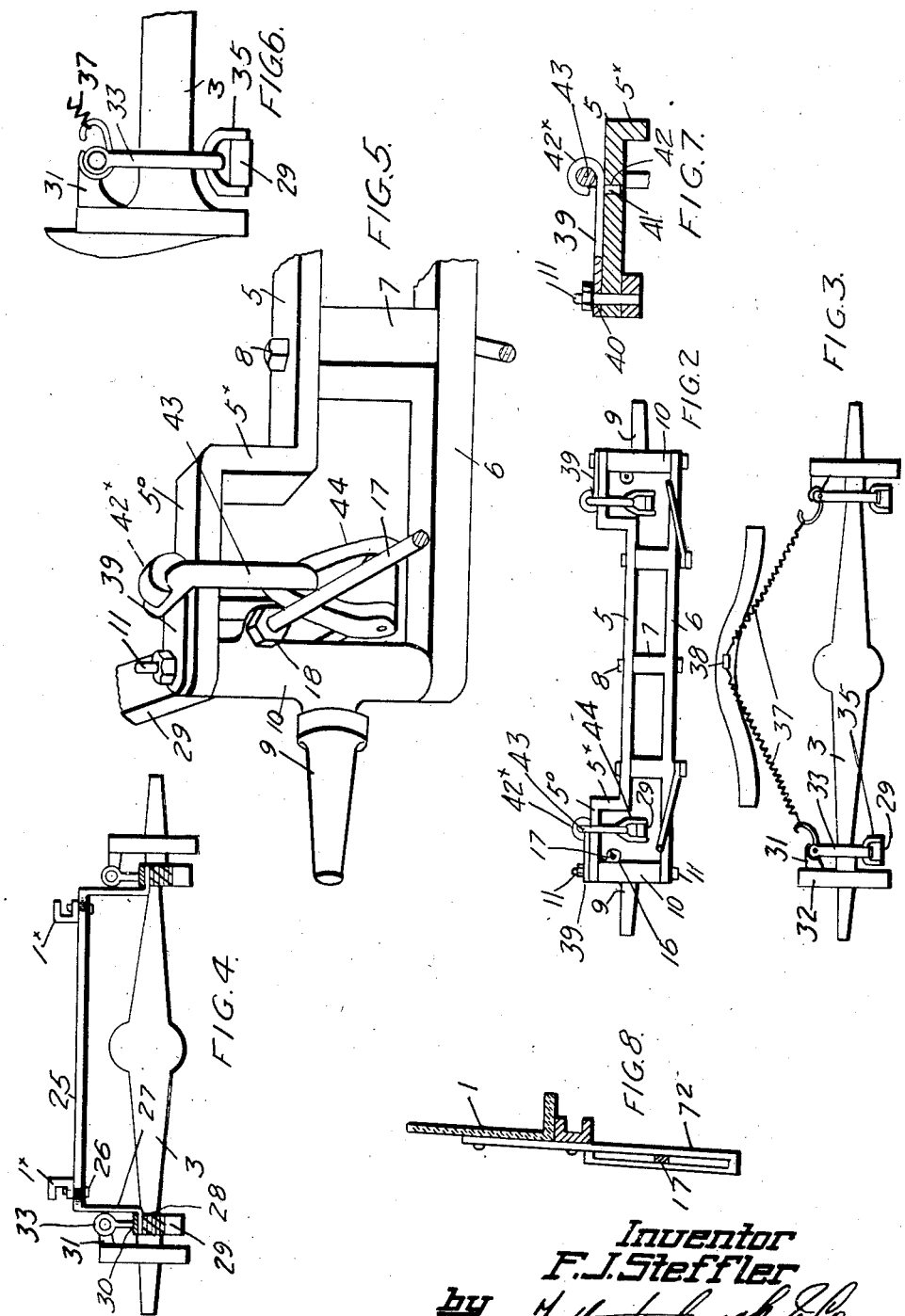

Patented Mar. 6, 1928.

1,661,511

UNITED STATES PATENT OFFICE.

FRANK JOSEPH STEFFLER, OF TEESWATER, ONTARIO, CANADA.

AUTOMOBILE SLEIGH.

Application filed February 26, 1927. Serial No. 171,209.

My invention relates to improvements in automobile sleighs, and the object of the invention is to devise a simple and cheap construction of automobile which is adaptable for use in winter under all weather conditions, and it consists essentially of the arrangement and construction of parts as hereinafter more particularly explained.

Fig. 1 is a side elevation of my apparatus as applied to the body of an automobile truck.

Fig. 2 is a detail view of the floating axle.

Fig. 3 is a detail of the rear suspension showing the rear axle and adjacent parts.

Fig. 4 is a similar view to Figure 3 showing the rear axle looking from the opposite direction and the central support to the side suspension springs.

Fig. 5 is an enlarged perspective detail showing the connection between the side suspension springs and an end of the floating axle.

Fig. 6 is an enlarged detail showing the rear connection of the side springs to the rear axle.

Fig. 7 is an enlarged sectional detail of the connecting bracket mounted upon the end floating axle.

Fig. 8 is a detail view of the guide bracket carried by the automobile body.

Fig. 9 is an enlarged perspective detail of the lifting means for the front sleigh runner.

Fig. 10 is a perspective detail of one of the bracket members 49 and 50.

In the drawings like characters of reference indicate corresponding parts in each figure.

1 indicates the body of an automobile truck, 2 the front axle and 3 the rear axle. 4 is the rear traction wheel mounted in the usual manner upon each end of the rear axle 3. 5 and 6 are two bar members spaced apart by spacing portions 7 and connected by bolts 8 extending through the bars 5 and 6 and the spacing portions 7.

The ends of the bar 5 are upturned at each end as indicated at 5$^x$ and then turned outwardly as at 5° parallel with the main portion of the bar 5 and the bar 6.

9 are axle arms provided at their inner ends with sleeves 10 mounted upon the vertical bolt 11 extending through the ends of the bars 5 and 6. 12 are intermediate wheels mounted upon the arms 9 in closely spaced relation with the wheels 4. 13 is a traction chain extending around the wheels 4 and 12 at each side of the body 1 of the automobile, such chain consisting of a series of links 13$^x$ pivoted together at 13° and provided with outwardly directed flanges 14 and saddle portions 15 extending around the periphery of the wheels 4 and 12 as the chain engages therewith.

I do not describe this chain further in detail as it forms the subject matter of a co-pending application.

16 is a lug extending inwardly from each sleeve 10. 17 is a tension rod extending through orifices in the lug 16 and secured therein by means of nuts 18.

The outer end of each rod 17 is connected by a tension spring 18$^x$ to a threaded rod member 19 forming part of a turnbuckle 20 provided at its opposite end with a rod member 21 extending through a lug 22 and secured therein by a nut 23.

By this means tension is exerted equally on each side of the floating axle formed by the bars 5 and 6.

24 are brace rods connected at one end to each of the tension rods 17 intermediately of their length, and at the opposite end to the lower end of one of the securing bolts 8 connecting the members 5 and 6 of the floating axle together.

1$^x$ indicates the side bars of the chassis frame of the automobile.

25 is a cross bar secured to the side bars 1$^x$ of the chassis frame as indicated by bolts 26. The ends of the bar 25 are provided with down turned portions 27 terminating in out turned portions 28 which form central supports for the side suspension springs 29, the portion 28 extending into brackets 30 carried by the springs 29 pivotally mounting the springs upon the depending ends 27 of the bar 25.

By this means it will be seen that each tractor member formed by the wheels 4 and 12 and tractor chain 13 is pivotally mounted so as to swing centrally and therefore can readily adjust itself to the road level and tip to produce maximum traction when in a mud hole or any like situation.

31 are arms which according to common construction extend from the covering plate of the brake housing 32. 33 is a clevis pivotally secured at its upper end to the arm 31. 35 is a clevis extending through an orifice formed in the lower end of the clevis 33 and between which the rear end of the side spring 29 is pivotally secured as indicated at 36. 37 are tension springs having a hooked engagement to the bracket 31 as indicated in Figures 3 and 6 at their lower end, the upper ends of the spring being connected to the rear end of the chassis frame as indicated at 38. see Figure 3.

By this means it will be seen that the rear traction wheels 4 will be permitted to swing downward against the resistance of the springs 37 when the springs 29 tilt upon the central support as previously described.

39 is a bracket provided at its outer end with an orifice 40 through which the pivot bolt 11 of the axle arms 9 extend. The bracket 39 is also provided with a pin 41 in proximity to its opposite end fitting into a hole 42 formed in the bar 5. The inner end of the bracket 39 is looped upward as indicated at 42× to receive the link 43 which depends at each side into the bar portion 5° of the bar 5.

44 is a clevis swung at its upper end in the link 43 and pivotally connected at its lower end as indicated at 45 to the front end of the suspension spring 29 thereby connecting such front end to the floating axle.

Referring to Figure 9. 46 is the inner hub plate forming part of the mounting of the usual front wheel of an automobile on the front axle 2.

47 is the outer hub plate. The inner and outer plates 46 and 47 are separated apart to receive a pair of bracket members 49 and 50. Each bracket member 49 and 50 is provided with a depending lug 51 pivotally connected by a pivot bolt 52 extending through a lug 53 carried by the sleigh runner 54. 55 is a spacing block inserted between the upper ends of the members 49 and 50 and formed to provide a receiving space for the lifting lever 56 which extends between the inner and outer hub plates 46 and 47, being secured therebetween by two of the bolts 47×, and upon the lower end of which is mounted a lifting wheel 49. The remaining bolts 47° extending through the hub plates 46 and 47, bracket members 49 and 50 and spacing block 55 securing the parts together. 57 is a lever located in proximity to the driver's seat so as to manually operate it, such lever coacting with a quadrant 58 and locking dog 59.

The lower end of the lever 57 is mounted upon a cross rod 60 provided at its ends with arms 70 connected by a link rod 71 to the upper end of the lifting lever 56.

72 is a looped bracket forming a guide for each of the tension rods 17.

Having described the principal parts involved in my invention I will briefly describe the operation of the same.

The rear wheels 4 are driven in the usual manner, the wheels 12 acting as idler wheels to carry the tractor chain 13 which in revolving grips the snow so as to force the vehicle forward and carry the sleigh runners 54 over the surface of the snow. The wheels 4 and 12 swing on the pivot point formed by the out turned ends 28 of the cross bar 25 so as to follow the surface of the snow and climb in and out of any depressions which may occur.

When the vehicle comes to a bare spot where the runners 54 cannot operate, the driver pulls the lever 57 in the direction of arrow thereby pulling the arms 70 rearwardly and the rod 71 in the corresponding direction thereby simultaneously swinging the lifting wheel 49 downward into contact with the road surface, and at the same time lifting the sleigh runner 54 from such surface. The front of the vehicle travelling upon the wheels 49 until such bare spot is passed.

From this description it will be seen that I have devised a very simple construction of snow sleigh which may operate under all conditions and which if desired may be used for city travel over short distances when necessary, and yet can be readily adaptable for travelling over the snow under all conditions of the road.

What I claim as my invention is:—

In an automobile sleigh, the combination with the body, tractor wheels thereof, front axle and an inner hub plate at each end thereof, of outer hub plates spaced from each inner plate, bracket members inserted between the inner and outer hub plates, lugs depending therefrom, sleigh runners, a pivotal connection between the lower ends of the lugs and the runners, a lifting arm secured between the hub plates, a lifting wheel at the lower end of the arm, and manually operated means connected to the upper end of the lifting lever for turning the hub plates to simultaneously carry the lifting wheel into engagement with the roadway and the runners out of engagement.

FRANK JOSEPH STEFFLER.